US010922122B2

(12) United States Patent
Chopra et al.

(10) Patent No.: US 10,922,122 B2
(45) Date of Patent: Feb. 16, 2021

(54) SYSTEM AND METHOD FOR VIRTUAL MACHINE RESOURCE TAGGING

(71) Applicant: EMC IP Holding Company LLC, Hopkinton, MA (US)

(72) Inventors: Shelesh Chopra, Bangalore (IN); Mohammed Abdul Samad, Bangalore (IN); Gururaj Kulkarni, Bangalore (IN); Mahipat Kulkarni, Bangalore (IN); Pavankumar Ati, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/143,369

(22) Filed: Sep. 26, 2018

(65) Prior Publication Data
US 2020/0097309 A1  Mar. 26, 2020

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4862* (2013.01);
(Continued)

(58) Field of Classification Search
CPC .. G06F 9/455; G06F 9/45533; G06F 9/45558; G06F 2009/45575; G06F 9/48; G06F 9/4806; G06F 9/4843; G06F 9/485; G06F 9/4856; G06F 9/4862; G06F 9/4868; G06F 9/4875; G06F 9/50; G06F 9/5061; G06F 9/5077; G06F 11/14; G06F 11/1458; G06F 11/1461; G06F 11/1464; G06F 9/5064
See application file for complete search history.

(56) References Cited

U.S. PATENT DOCUMENTS 9,112,777 B1    8/2015 Barclay et al.
9,292,327 B1 *  3/2016 von Thenen ........ G06F 11/1451
(Continued)

OTHER PUBLICATIONS

"VSphere Data Protection Administration Guide: vSphere Data Protection 6.0"; VMware, Inc.; 2015.
(Continued)

*Primary Examiner* — Charles M Swift
(74) *Attorney, Agent, or Firm* — Chamberlain, Hrdlicka, White, Williams & Aughtry

(57) ABSTRACT

A remote agent for managing virtual machines includes a persistent storage and a backup manager. The persistent storage stores backup/restoration policies. The backup manager generates backups of the virtual machines based on the backup/restoration policies. The remote agent also includes a resource tagger that obtains a management request for a virtual machine of the virtual machines; in response to obtaining the management request: performs a remote resource analysis of the virtual machine to obtain an application profile of the virtual machine; performs a multidimensional application analysis of the application profile to identify at least one tag; and applies the at least one tag to the virtual machine.

20 Claims, 12 Drawing Sheets

(51) Int. Cl.
*G06F 11/14* (2006.01)
*G06F 9/50* (2006.01)
(52) U.S. Cl.
CPC .......... *G06F 9/4868* (2013.01); *G06F 9/4875* (2013.01); *G06F 9/50* (2013.01); *G06F 9/5061* (2013.01); *G06F 9/5072* (2013.01); *G06F 11/14* (2013.01); *G06F 11/1461* (2013.01); *G06F 11/1464* (2013.01); *G06F 2009/45575* (2013.01); *G06F 2201/815* (2013.01)

(56) References Cited

U.S. PATENT DOCUMENTS

| | | | |
|---|---|---|---|
| 9,329,949 B2 | 5/2016 | Sampath et al. | |
| 9,396,052 B2 | 7/2016 | Sampath et al. | |
| 9,417,978 B2 | 8/2016 | Arata | |
| 9,720,783 B1* | 8/2017 | Kulkarni | G06F 11/1461 |
| 2009/0313447 A1 | 12/2009 | Nguyen et al. | |
| 2011/0083131 A1* | 4/2011 | Pirzada | G06F 9/45533 |
| | | | 718/1 |
| 2011/0258481 A1* | 10/2011 | Kern | G06F 11/1484 |
| | | | 714/4.1 |
| 2013/0074072 A1* | 3/2013 | Kennedy | G06F 9/44505 |
| | | | 718/1 |
| 2014/0095868 A1* | 4/2014 | Korthny | G06F 21/6218 |
| | | | 713/165 |
| 2014/0181038 A1 | 6/2014 | Pawar et al. | |
| 2015/0033221 A1* | 1/2015 | Chari | H04L 63/105 |
| | | | 718/1 |
| 2015/0263983 A1* | 9/2015 | Brennan | H04L 47/70 |
| | | | 709/226 |
| 2015/0269031 A1* | 9/2015 | Wang | G06F 9/45558 |
| | | | 718/1 |
| 2016/0062858 A1* | 3/2016 | Gallagher | G06F 11/1484 |
| | | | 714/6.23 |
| 2016/0134113 A1* | 5/2016 | Dushane | H02J 3/14 |
| | | | 700/295 |
| 2016/0179416 A1 | 6/2016 | Mutha et al. | |
| 2016/0202923 A1* | 7/2016 | Liu | G06F 9/461 |
| | | | 711/162 |
| 2017/0116040 A1* | 4/2017 | Cropper | G06F 9/45558 |
| 2017/0185438 A1* | 6/2017 | Thomas | G06F 8/61 |
| 2017/0269954 A1* | 9/2017 | Hardy | G06F 9/45558 |
| 2018/0107561 A1* | 4/2018 | Bender | G06F 16/188 |
| 2018/0165166 A1 | 6/2018 | Wang et al. | |
| 2018/0276085 A1* | 9/2018 | Mitkar | G06F 11/324 |
| 2018/0285203 A1* | 10/2018 | Cox | G06F 11/1464 |
| 2019/0235967 A1* | 8/2019 | Sharma | G06F 3/0619 |

OTHER PUBLICATIONS

Extended European Search Report issued in corresponding European Application No. 19198032.5, dated Feb. 19, 2020.

* cited by examiner

SYSTEM AND METHOD FOR VIRTUAL MACHINE RESOURCE TAGGING

BACKGROUND

Computing devices may store information. The information may reflect information entered by a user. Thus, the information may be important to a user.

For example, a user may type information into a database, may add data to a spreadsheet, or may draft emails. Each of these interactions between a user and a community device may cause information important to a user to be stored in a computing device.

SUMMARY

In one aspect, a remote agent for managing virtual machines in accordance with one or more embodiments of the invention includes a persistent storage and a backup manager. The persistent storage stores backup/restoration policies. The backup manager generates backups of the virtual machines based on the backup/restoration policies. The remote agent also includes a resource tagger that obtains a management request for a virtual machine of the virtual machines; in response to obtaining the management request: performs a remote resource analysis of the virtual machine to obtain an application profile of the virtual machine; performs a multidimensional application analysis of the application profile to identify at least one tag; and applies the at least one tag to the virtual machine.

In one aspect, a method for managing virtual machines in accordance with one or more embodiments of the invention includes obtaining a management request for a virtual machine of the virtual machines; in response to obtaining the management request: performing a remote resource analysis of the virtual machine to obtain an application profile of the virtual machine; performing a multidimensional application analysis of the application profile to identify at least one tag; applying the at least one tag to the virtual machine; and generating backups of the virtual machines based on both of the backup/restoration policies and the at least one tag.

In one aspect, a non-transitory computer readable medium in accordance with one or more embodiments of the invention includes computer readable program code, which when executed by a computer processor enables the computer processor to perform a method for managing virtual machines. The method includes obtaining a management request for a virtual machine of the virtual machines; in response to obtaining the management request: performing a remote resource analysis of the virtual machine to obtain an application profile of the virtual machine; performing a multidimensional application analysis of the application profile to identify at least one tag; applying the at least one tag to the virtual machine; and generating backups of the virtual machines based on both of the backup/restoration policies and the at least one tag.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines. More specifically, the systems, devices, and methods may manage virtual machines by ensuring that backups of the virtual machines are stored in backup storage.

In one or more embodiments of the invention, the system includes an automated tagging process based on the applications hosted by the virtual machines. The applications may be used as indirect indicators of the relative importance of the virtual machine for backup purposes. More resources may be dedicated toward backing up high (or relatively high) importance virtual machines and fewer resources may be dedicated toward backing up low (or relatively low) importance virtual machines. In this manner, embodiments of the invention may ensure the quality of services provided to users of the virtual machines while ensuring a minimum level of backup services are provided to the virtual machines.

Figure 1:
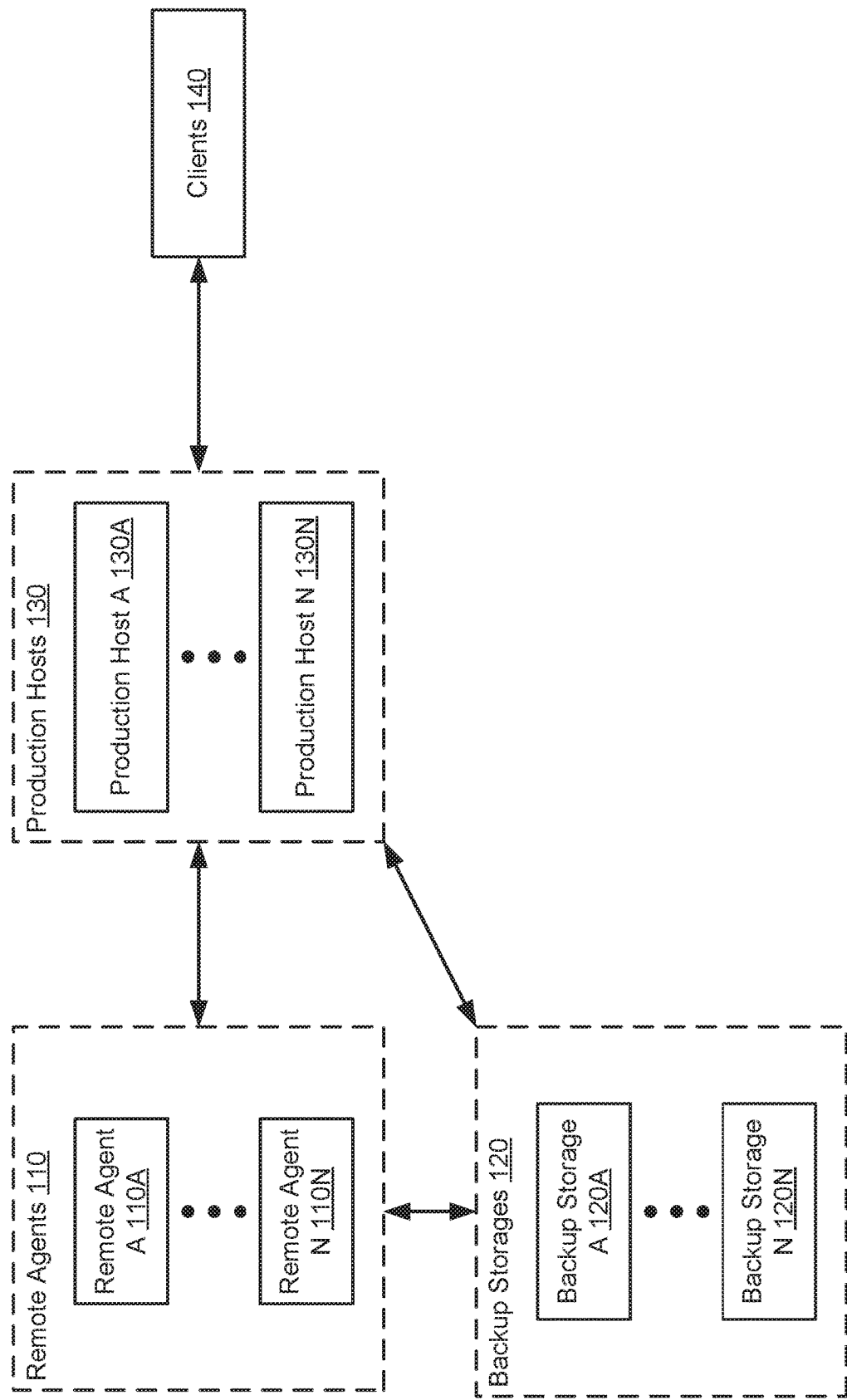
FIG. 1 shows a diagram of a system in accordance with one or more embodiments of the invention.

FIG. 1 shows an example system in accordance with one or more embodiments of the invention. The system may include clients (140) that obtain services from virtual machines hosted by production hosts (130). For additional details regarding production hosts, see e.g., FIG. 2A. For additional details regarding virtual machines, see e.g., FIG. 2B.

The remote agents (110) may orchestrate the generation and storage of backups of the virtual machines in backup storage (120). The remote agents (110) may generate backups based on tags applied to the virtual machines.

Figure 4A:
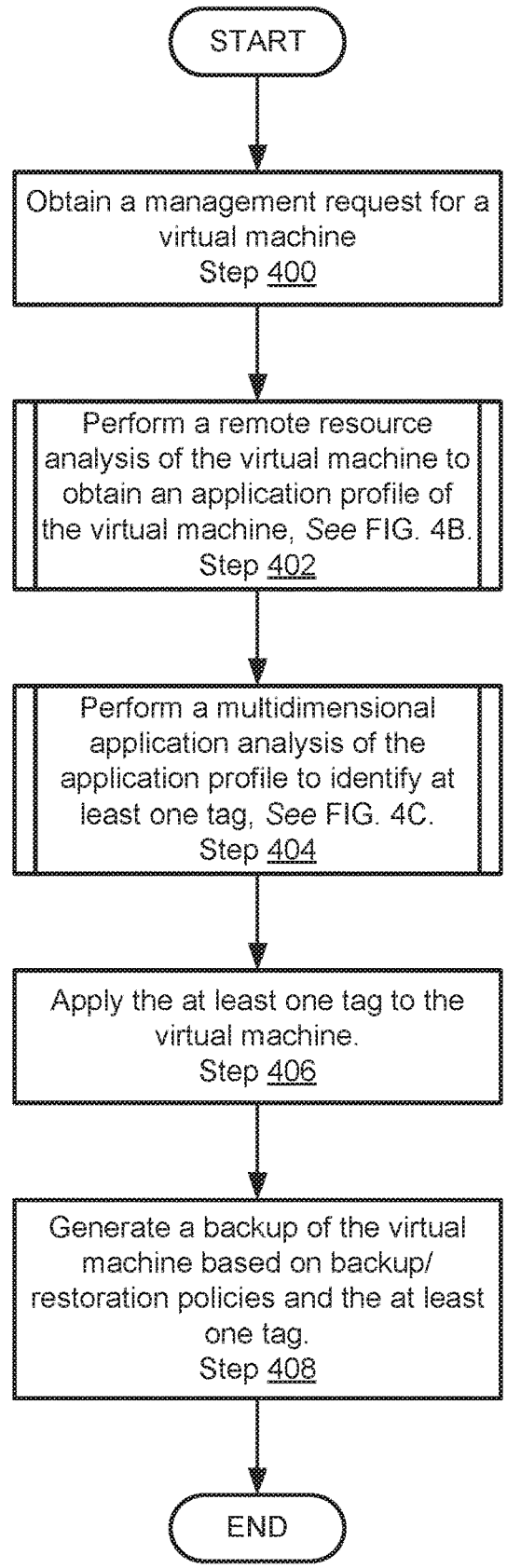
FIG. 4A shows a flowchart of a method of managing virtual machines in accordance with one or more embodiments of the invention.
Figure 5:
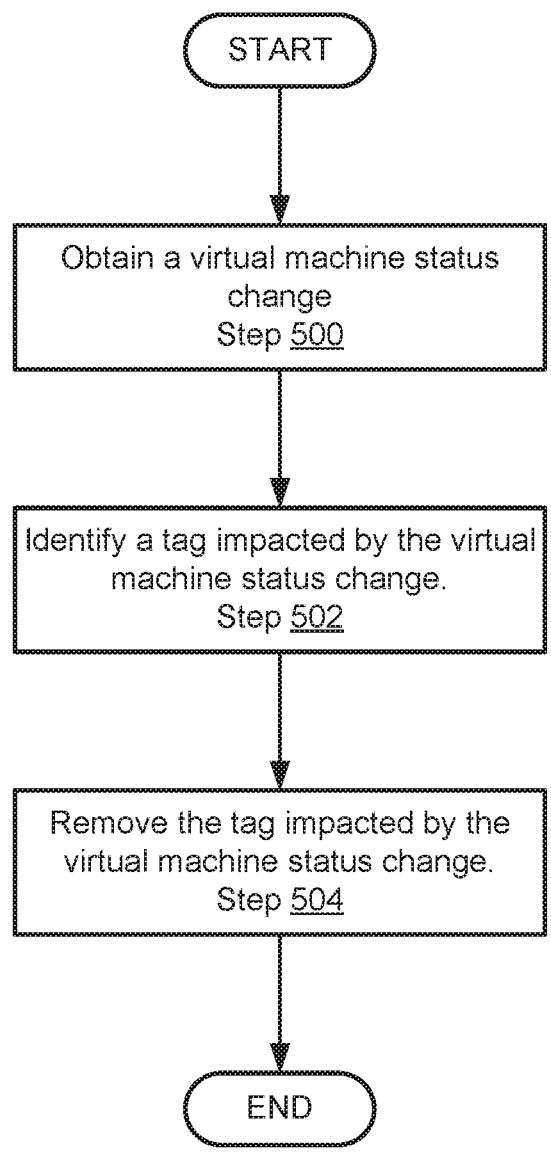
FIG. 5 shows a flowchart of a method of modifying tags associated with a virtual machine in accordance with one or more embodiments of the invention.
Figure 6A:
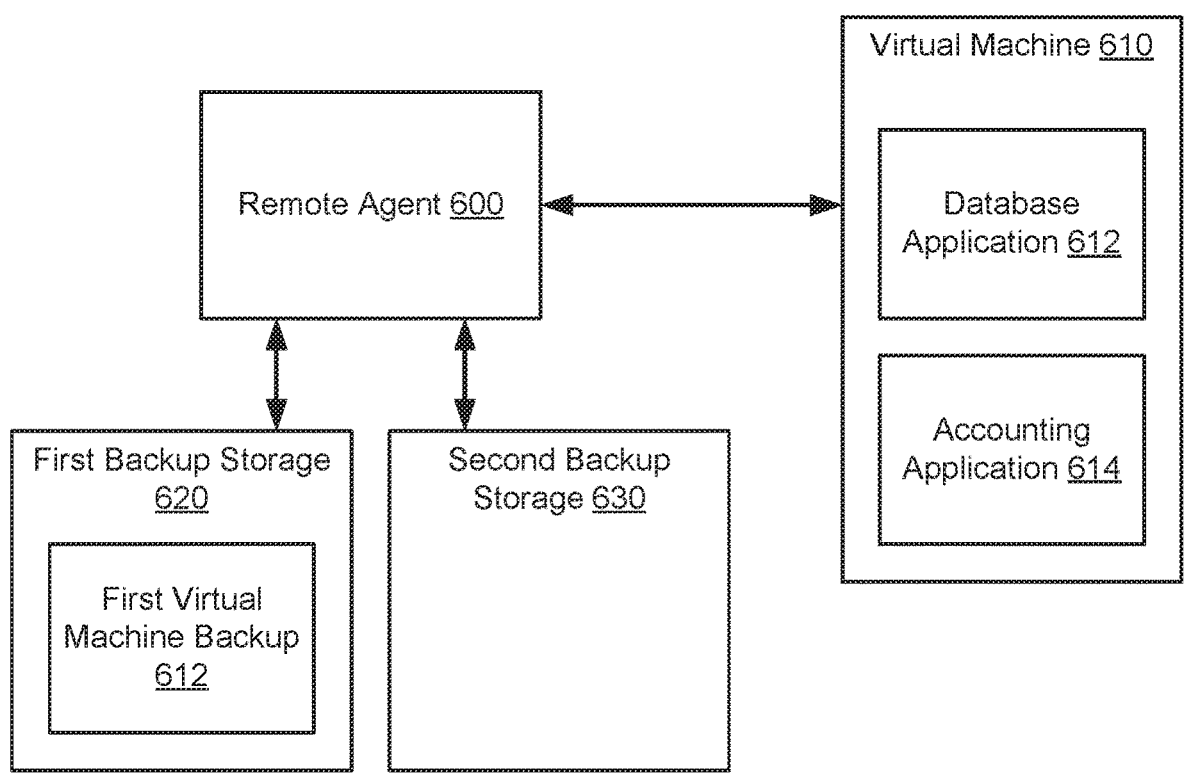
FIG. 6A shows a diagram of an example system at a first point in time.
Figure 6B:
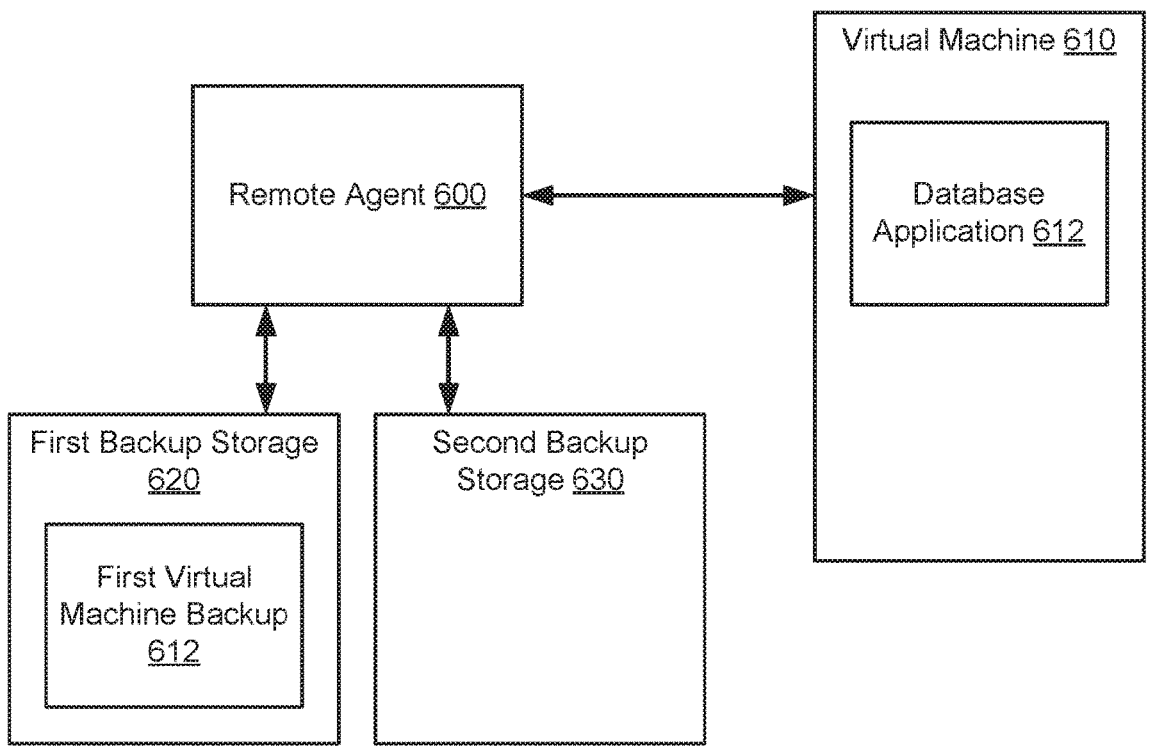
FIG. 6B shows a diagram of the example system of FIG. 6A at a second point in time.
Figure 6C:
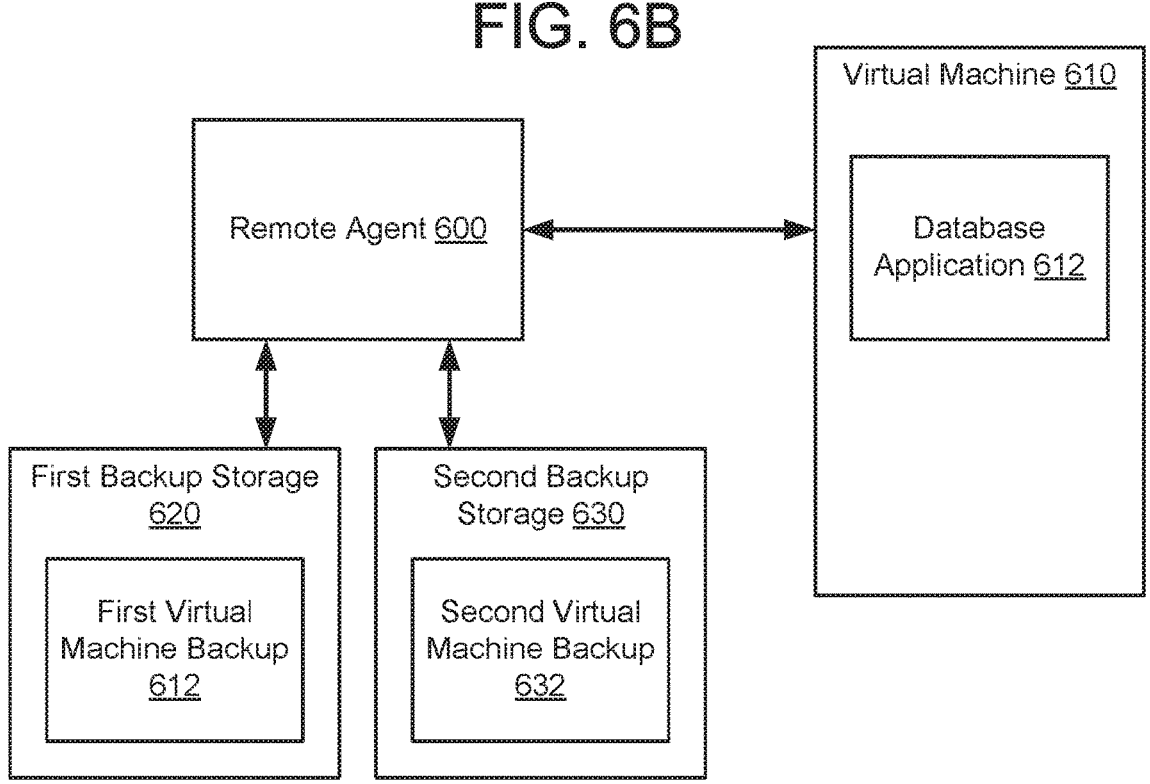
FIG. 6C shows a diagram of the example system of FIG. 6A at a third point in time.

The remote agents (110) may monitor the virtual machines and apply tags to the virtual machines. In one or more embodiments of the invention, the remote agents (110) perform the methods illustrated in FIGS. 4A-5 to tag virtual machines, generate backups of virtual machines, and store the backups of the virtual machines. An example of managing virtual machines, including generating backups, in accordance with the methods of FIGS. 4A-5 is illustrated in FIGS. 6A-6C.

The remote agents (110) may generate backups by performing backup workflows. The workflows may be specified by backup/restoration policies. For additional details regarding backup/restoration policies, see e.g., FIG. 3B.

Each component of the system of FIG. 1 may be operably connected via any combination of wired and wireless connections. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, see e.g., FIG. 7.

The clients (140) may interact with applications hosted by the production hosts (130). For example, the applications may be databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

For example, a production host may host an email application. One of the clients may utilize the services of the email application by receiving and sending emails via the email application. Copies of the client's emails may be stored as part of the email application data. By doing so the email application may host data in the form of emails that are important to the client.

In one or more embodiments of the invention, the applications are hosted by virtual machines. The virtual machines may be hosted by the production hosts. In this manner, different clients may be provided different services by different virtual machines which are in turn hosted by different production hosts.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and all, or a portion thereof, of the methods illustrated in FIGS. 4A-5. The production hosts (130) may be other types of computing devices without departing from the invention. For additional details regarding computing devices, see e.g., FIG. 7.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across any number of separate and/or distinct computing devices. In such a scenario, the functionality of the production hosts (130) may be performed by multiple different computing devices without departing from the invention.

In one or more embodiments of the invention, the production hosts (130) host virtual machines. Each of the virtual machines may host any number of applications. The applications may provide services to the clients (140), or any other entity. For additional details regarding the production hosts (130), see e.g., FIG. 2A.

In one or more embodiments of the invention, the remote agents (110) are computing devices. A computing device may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 4A-5. The remote agent (110) may be other types of computing devices without departing from the invention. For additional details regarding computing devices, see e.g., FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agent (110) may be distributed devices that include components distributed across any number of separate and/or distinct computing devices. In such a scenario, the functionality of the remote agent (110) may be performed by multiple different computing devices without departing from the invention.

In one or more embodiments of the invention, the remote agents (110) orchestrate backup generation restoration of virtual machines hosted by the production hosts (140). For example, the remote agents (110) may orchestrate the generation of backups of virtual machines by first identifying a relative priority of each of the virtual machines and then generating backups of virtual machines using the identified relative priorities of the virtual machines.

In one or more embodiments of the invention, the remote agents (110) identify the relative priority of each of the virtual machines based on the applications hosted by the respective virtual machine. For example, different types of applications indicate differences in the relative priority of each of virtual machines. A database may, for example, warrant prioritization for backup purposes when compared to an image server.

In one or more embodiments of the invention, the remote agents (110) performing multidimensional analysis of the applications hosted by the virtual machines for determining relative priority of virtual machines for backup generation purposes. As will be discussed in greater detail below, different applications or other characteristics of virtual machines may indicate different levels of priority for backup generation purposes. By doing so, one or more embodiments of the invention may efficiently marshal limited computing resources of a distributed system for backup generation purposes. In contrast contemporary systems, embodiments of the invention may perform this analysis continuously and thereby continuously change the backup generation behavior of the distributed system in accordance with changes to the system.

One more embodiments of the invention, the remote agents (110) may also provide restoration services to virtual machines for the production hosts (140). Restoring a virtual machine may change a state of the virtual machine to previous state represented by one or more backups stored in backup storage. For additional details regarding remote agents, see e.g., FIG. 3A.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4A-4B. For additional details regarding computing devices, see e.g., FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, virtual machine images, incremental backups, application images, or incremental backups of applications. Other types of backups may be stored in the backup storages (120) without a party from the invention. Any quantity of backup data may be stored in the backup storages (120) without departing from the invention. The backup data may be associated with respective applications or virtual machines from which the backup data was obtained.

In one or more embodiments of the invention, the backup storages (120) deduplicate the backup data against existing data stored in the backup storages. By deduplicating the backup data, the quantity of data that it can stored in the backup storages may be increased when compared to storing the backup data without deduplication. To deduplicate the backup data, the backup storages (120) may only storing copies of unique portions of the backup data. When storing the backup data, the backup data may first be checked to determine whether it is duplicative of data already stored in the backup storage. Only the unique portions of the backup data may be stored in the backup storage. Storing and accessing deduplicated backup data may be significantly more computing resource costly than storing backup data that is not deduplicated.

Figure 2A:
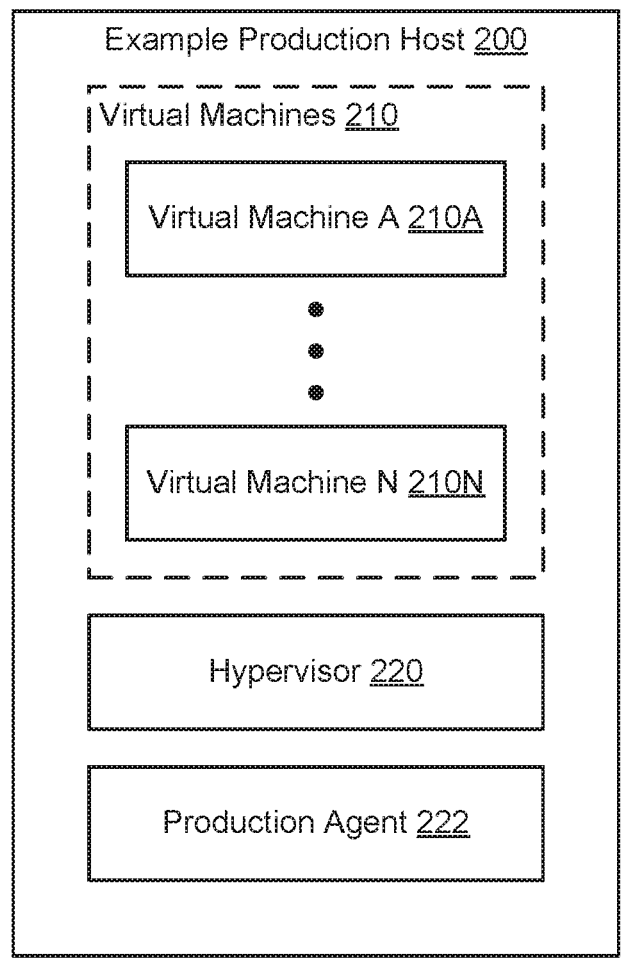
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention.

In one or more embodiments of the invention, the example production host (200) hosts virtual machines (210). The virtual machines (210) may host any number of applications as will be described in greater detail with respect to FIG. 2B. Each of the virtual machines (210A, 210N) may host similar or different applications without departing from the invention.

In one or more embodiments of the invention, the example production host (200) includes a hypervisor (220). The hypervisor (220) may allocate computing resources to the virtual machines (210). For example, the hypervisor (220) may dedicate processor cycles, memory space, and storage space for use by the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

In one or more embodiments of the invention, the example production host (200) includes a production agent (222). The production host (222) may orchestrate the generation of backups of entities hosted by the example production host (200). For example, the production agent (222)

may orchestrate the generation of backups of the virtual machines or applications hosted by the virtual machines. When orchestrating the generation of backups, the production agent (222) may perform all or a part of the methods illustrated in FIGS. 4A-5.

In one or more embodiments of the invention, the production agent (222) is a hardware device including circuitry. The production agent (222) may be, for example, a digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be a hardware processor including circuitry such as, for example, a central processing unit or a microcontroller. The processor may be other types of hardware devices for processing digital information without departing from the invention.

Figure 2B:
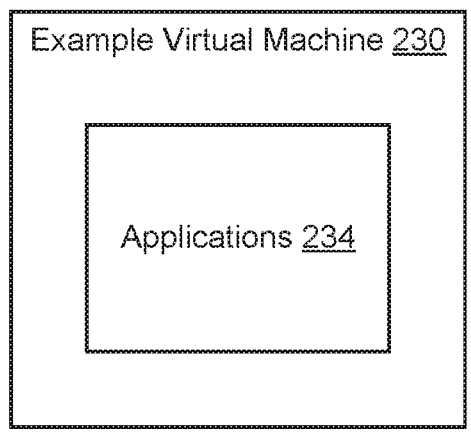
FIG. 2B shows a diagram of a virtual machine in accordance with one or more embodiments of the invention.

As discussed above, production hosts may host virtual machines. FIG. 2B shows a diagram of an example virtual machine (230) in accordance with one or more embodiments of the invention. The example virtual machine (230) may be a virtualized entity utilizing computing resources of one or more production hosts. The example virtual machine (230) may host any number of applications (234). The applications (234) may be, for example, transactional databases, email servers, file storage, or any other type of application that may provide services to clients. Applications (234) may provide services to other entities that departing from the invention.

Applications (234) may utilize computing resources over virtual machine hosting applications. The computing resources may be, in turn, allocated to the virtual machine hosting the applications from a production host hosting the virtual machine.

Figure 3A:
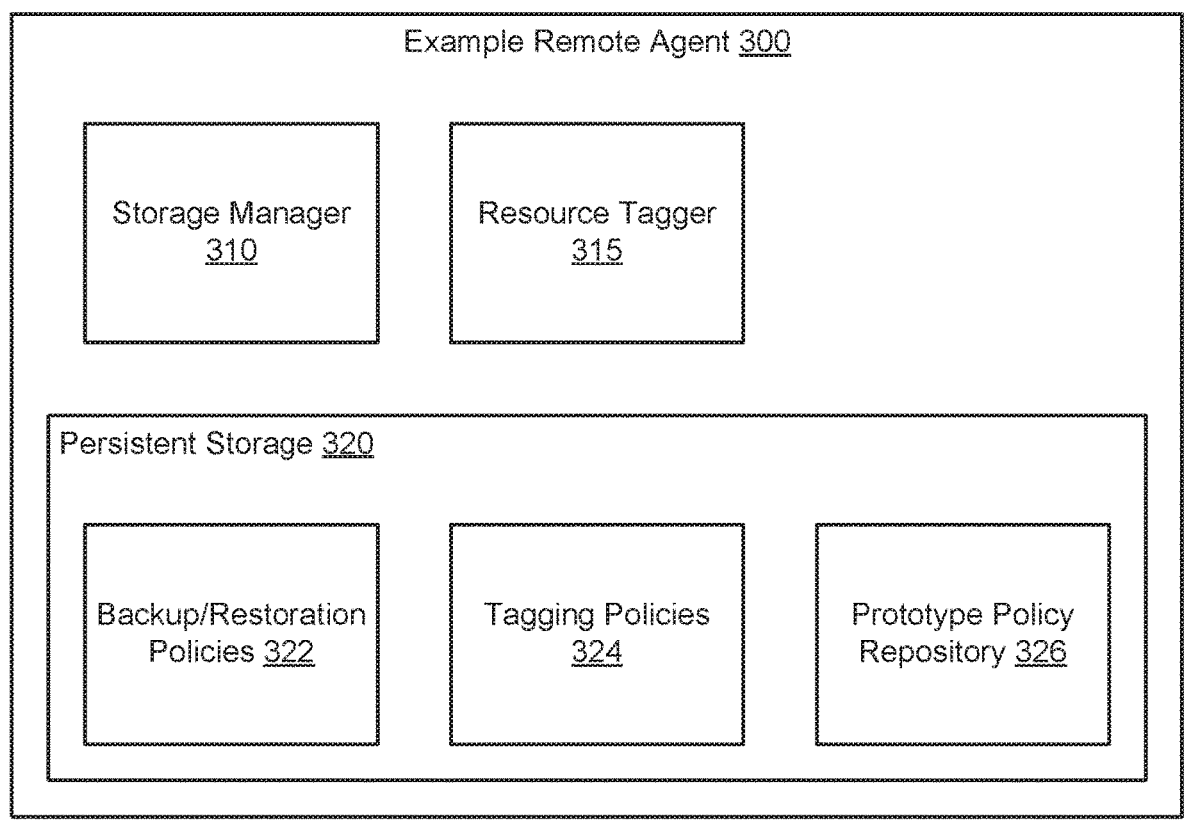
FIG. 3A shows a diagram of an example remote agent in accordance with one or more embodiments of the invention.

As discussed above, the remote agents may orchestrate storage of production host data in backup storage. FIG. 3A shows a diagram of an example remote agent (300) in accordance with one or more embodiments of the invention.

In one or more embodiments of the invention, the example remote agent (300) orchestrates the storage of data from the production hosts in backup storage. Similarly, the example remote agent (300) may orchestrate the restoration of the production hosts using data stored in the backup storage.

In one or more embodiments of the invention, the example remote agent (300) prioritizes the backup of virtual machines. In other words, the example remote agent (300) may preferentially provide backup services to some virtual machines over other virtual machines.

In one or more embodiments of the invention, the example remote agent (300) prioritizes the backup of virtual machines based on, at least in part, the applications hosted by respective virtual machines. For example, some applications hosted by the respective virtual machines may indicate a higher priority for backup generation purposes of the virtual machine.

To provide the aforementioned functionality, the example remote agent (300) includes a storage manager (310), a tagger (315), and a persistent storage (320). Each component of the example remote agent (300) as discussed below.

In one or more embodiments of the invention, the storage manager (310) orchestrates generation of backups and performance of restorations, as discussed above. To provide the aforementioned functionality, the backup manager (310) may perform all, or a portion, of the methods illustrated in FIGS. 4A-5.

For example, the storage manager (310) may perform backup generation in accordance with backup policies stored in the backup/restoration policies (322). The backup policies may specify workflows perform backups.

In one or more embodiments of the invention, the backup policies of the backup/restoration policies (322) may be keyed to tags applied to virtual machines by users. In other words, as users interact with virtual machines through the clients, or other entities, the users may apply tags to the virtual machines. A tag may be, for example, metadata regarding the virtual machine. The tag may indicate characteristic of the virtual machine ascribed by the user. Any number of tags may be applied to a virtual machine by the users. Because of the diversity available tags including custom tags, there may not always be backup policies keyed to all possible tags that a user may ascribe to a virtual machine. Accordingly, from the perspective of the storage manager (310) some of the virtual machines may not be tagged with relevant tags.

In such a scenario, the storage manager (310) may automatically instantiate and enforce a backup policy for the virtual machine. When doing so, the storage manager (310) may utilize a prototype policy from the prototype policy repository (324) stored in the persistent storage (320). As we discussed in greater detail below, prototype policy repository (324) may specify policies to be applied to entities for which relevant tags are not available. By doing so, embodiments of the invention may ensure that a baseline level of backup services are provided to all virtual machines, or other entities, hosted by the production hosts.

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be a hardware processor including circuitry such as, for example, a central processing unit or a microcontroller. The processor may be other types of hardware devices for processing digital information without departing from the invention.

In one or more embodiments of the invention, the resource tagger (315) automatically applies tags to resources to be managed by the example remote agent (300). For example, the example remote agent (300) they automatically analyze virtual machines and apply tags to the virtual machines to ensure that relevant backup policies are keyed to the virtual machines. By doing so, embodiments of the invention may ensure or otherwise improve the likelihood of backups for the virtual machines being generated consistently and commensurately with the importance of the virtual machines. To provide the aforementioned functionality, the resource tagger (315) may perform all, or a portion, of the methods illustrated in FIGS. 4A-5.

For example, the resource tagger (315) may apply tags to virtual machines, or other entities, based on tagging policies (324) stored in the persistent storage (320). The tagging policies (324) may specify when and what type of tags are to be applied to virtual machines, or other entities.

In one or more embodiments of the invention, the resource tagger (315) may apply tags to virtual machines when the virtual machines are instantiated or otherwise become known to the example remote agent (300). For example, when a virtual machine is migrated for production host for which the example remote agent (300) orchestrates backup generation, the example remote agent (300) may apply any number of tags to the virtual machine based on the tagging policies (324). By doing so, embodiments of the invention ensure that each entity for which the example remote agent (300) provides backup services is tagged in a manner keyed to the backup/restoration policies (322). Consequently, embodiments of the invention may improve the likelihood or otherwise ensure that backups of entities managed by the example remote agent (300) are generated regularly and/or commensurately with the importance of the entities.

In one or more embodiments of the invention, the resource tagger (315) is a hardware device including circuitry. The resource tagger (315) may be, for example, a digital signal processor, a field programmable gate array, or an application specific integrated circuit. The resource tagger (315) may be other types of hardware devices without departing from the invention.

In one or more embodiments of the invention, the resource tagger (315) is implemented as computing code stored on a persistent storage that when executed by a processor performs the functionality of the resource tagger (315). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, solid state drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores backup/restoration policies (322), tagging policies (324), and a prototype policy repository (326). Each of these data structures as discussed below.

The backup/restoration policies (322) may be data structures that specify the workflows for generating backups and perform restorations of entities. The policies of the backup/restoration policies (322) may specify any number of characteristics of the workflows including, but not limited to, when a backup is generated, where it is stored, and a redundancy of the storage.

The tagging policies (324) may be a data structure that specifies tags that are to be applied based on application profiles. For example, the tagging policies (324) may specify tags to be applied to virtual machines, or other entities, that have a characteristic specified by a corresponding policy of the tagging policies. The tag specified by each of the policies of the tagging policies (324) may be unique or similar to other tags.

The prototype policy repository (326) may be a data structure that specifies backup policy prototypes. The scenario in which no backup service would be applied to an entity, example remote agent (300) may automatically instantiate policy based on the prototype policy repository (326) to ensure that the entity is given a minimum level of backup service. The prototype policy repository (326) may specify the policies on any basis. For example, policies may be specified as an organizational level. In other words, different organizations may specify that all the resources are to be provided a minimum level of backup service. The prototype policy repository (326) include policy specified on different bases without parting from the invention.

Figure 3B:
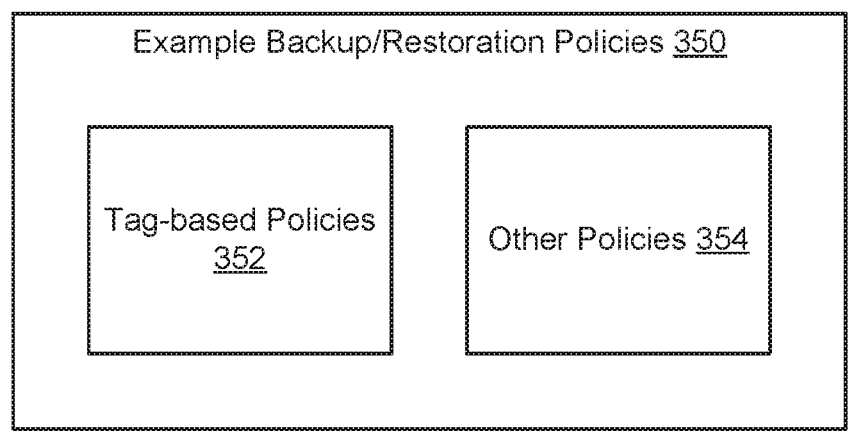
FIG. 3B shows a diagram of example backup/restoration policies in accordance with one or more embodiments of the invention.

As discussed above, remote agents may perform backups in accordance with backup policies. FIG. 3B shows a diagram of example backup/restoration policies (350) in accordance with one or more embodiments of the invention. As seen from FIG. 3B, the example backup/restoration policies (350) include, at least, tag-based policies (352) and other policies (354). Each of these types of policies as discussed below.

In one or more embodiments of the invention, tag-based policies (352) specify backup workflows for entities that are tagged with specific tags. For example, a tag-based backup policy may specify a workflow for tag called high priority. The workflow may specify when a backup is generated, where the backup stored, retention time with stored backup, a level of redundancy the stored backup, and any other parameters that may impact the workflow for storage of the backup. The tag called high priority may be, for example, an arbitrary string of characters selected by user. Alternatively, the tag called high priority may be, for example, the tag applied by the resource tagger. In either scenario, the backup workflow specified by the tag-based backup policy may govern the backups generated for the entity tagged with the tag called high priority.

In one or more embodiments of the invention, other policies (354) specify workflows for entities on a non-tag basis. In other words, the other policies (354) may be keyed to characteristics of entities other than tags.

In one or more embodiments of the invention, the other policies (354) specify a catchall workflow. The catchall workflow may, for example, apply to any entity for which all other policies do not apply. In this manner, embodiments of the invention may provide backup services to entities that have not been tagged and, consequently, automatically provide a minimum level backup services to all entities. Accordingly, embodiments of the invention may reduce the cognitive burden on users for specifying backup policies and/or tagging entities that would indirectly specify backup policies for entities by providing backup services without the need for user specification.

While the example backup/restoration policies (350) illustrated in FIG. 3B are shown as a separate data structure, the example backup/restoration policies (350) may be stored along with other data, stored in other locations, may be divided into any number of data structures, and/or spanned across any number of devices without departing from the invention.

As discussed above, components of the system of FIG. 1 may perform methods for generating backups of applications, or other entities, and performing restorations of such entities/applications, in addition to other functions. FIGS. 4A-5 show methods in accordance with one or more embodiments of the invention that may be performed by components of the system of FIG. 1.

FIG. 4A shows a flowchart of a method in accordance with one or more embodiments of the invention. The method depicted in FIG. 4A may be used to generate a backup of an entity in accordance with one or more embodiments of the invention. The method shown in FIG. 4A may be performed by, for example, a remote agent (e.g., 110, FIG. 1). Other components of the system illustrated in FIG. 1 may perform the method of FIG. 4A without departing from the invention.

In step 400, the management request for virtual machine is obtained.

In one or more embodiments of the invention, the request is obtained from a virtual machine that was instantiated or migrated for production host managed by the remote agent performing the method of FIG. 4A.

In order more embodiments of the invention, the management request specifies an identity of the virtual machine. The identity may include, for example, an identifier of the virtual machine, network identifier of the virtual machine, and/or any other information that may be used by the remote agent to discriminate the virtual machine from other virtual machines.

In step 402, remote resource analysis of the virtual machine is performed to obtain an application profile of the virtual machine.

In one or more embodiments of the invention, the remote resource analysis is performed by sending a request to production agent of the production host hosting the virtual machine. The production host may, upon receipt of the request, orchestrate execution of the remote resource analysis locally on the host hosting virtual machine.

In one or more embodiments of the invention, the remote resource analysis causes an application report to be generated by the production host hosting the virtual machine. The application report may, for example, specify each of applications hosted by the virtual machine. The application report may be sent to the remote agent, or another entity.

In one or more embodiments of the invention, the application profile of the virtual machine specifies an accounting of the applications hosted by the virtual machine. In one or more embodiments of the invention, the accounting includes the quantity of computing resources utilized by each application hosted by the virtual machine over time. The accounting time period may be, for example, one day, seven days, 30 days, or 90 days. The accounting time period may be other durations of time without departing from the invention.

One more embodiments of the invention, application profile of the virtual machine specifies a type of each application of the applications hosted by the virtual machine. The type of each application may, for example, based on the relative rate resource consumption of each application. The identity of each application may not be included in application profile. By doing so, embodiments of the invention may ensure that the identity of production host applications are kept secret, even to other entities of the system of FIG. 1. Accordingly, embodiments of the invention maintain stringent security requirements for data privacy concerns across the system while still providing appropriate levels of backup services applications hosted by the production host.

Figure 4B:
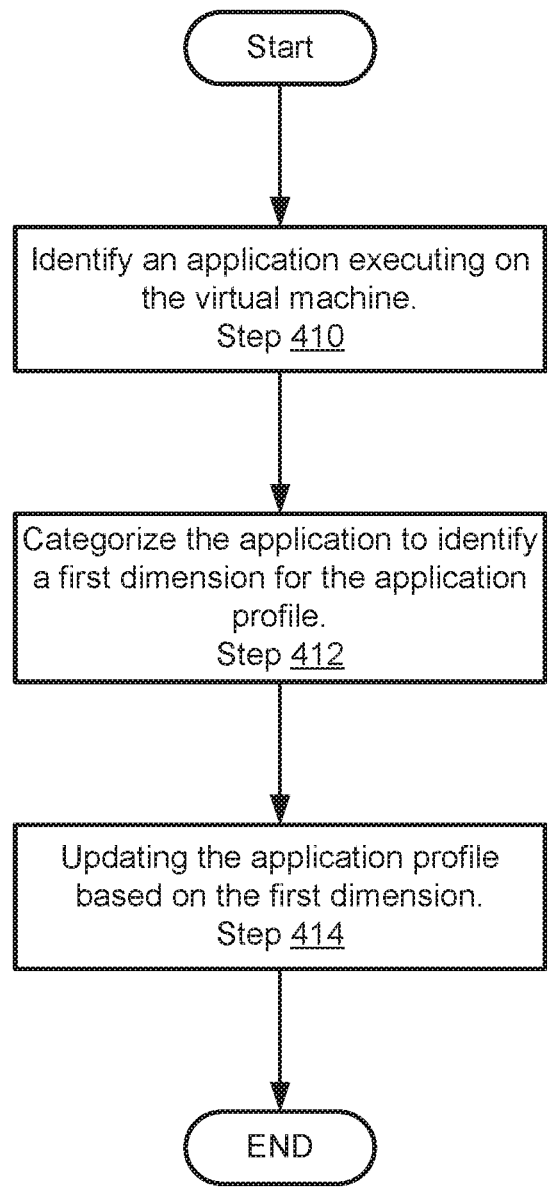
FIG. 4B shows a flowchart of a method of performing a remote resources analysis of a virtual machine to obtain an application profile in accordance with one or more embodiments of the invention.

In one or more embodiments of the invention, the remote resource analysis of the virtual machine is performed via the method illustrated in FIG. 4B. The remote resource analysis may be performed via other methods without parting from the invention.

In step 404, a multidimensional application analysis of the application profile obtained in step 402 is performed to identify at least one tag.

In one or more embodiments of the invention, the at least one tag is selected using tagging policies. For example, the applications identified by the application profile of the virtual machine may be matched to policies of the tagging policies. Each of the matched tagging policies may, in turn, specify a tag. Each of the tags specified by the matched tagging policies may be identified as the at least one tag.

Figure 4C:
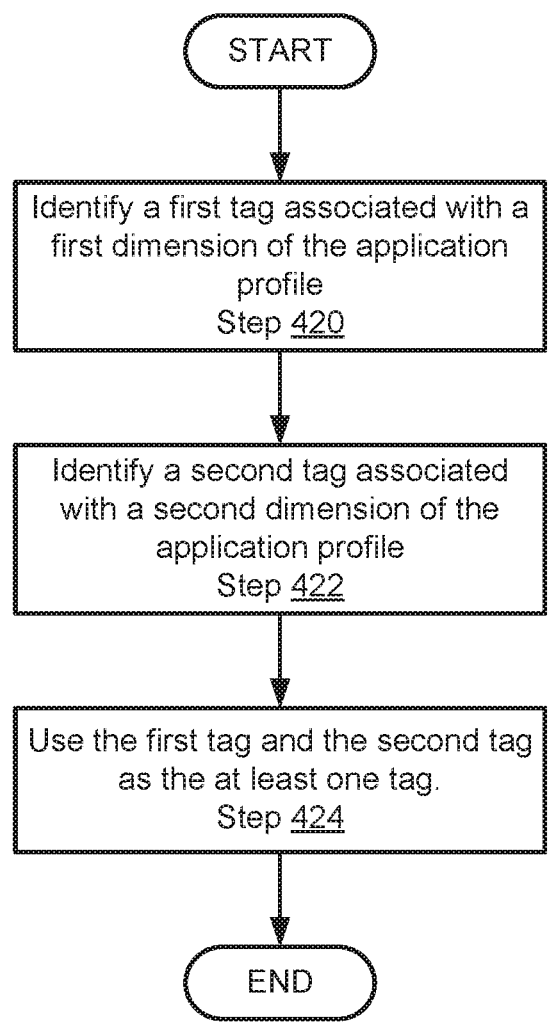
FIG. 4C shows a flowchart of a method of performing a multidimensional application analysis of an application profile to identify a tag in accordance with one or more embodiments of the invention.

One more embodiments of the invention, the multidimensional application analysis performed via the method illustrated in FIG. 4C. The multidimensional application analysis may be performed the other methods without parting from the invention.

In step 406, the at least one tag is applied to the virtual machine.

In one more embodiments of the invention, at least one tag supplied to the virtual machine by modifying metadata associated with the virtual machine to reflect the at least one tag. For example, if the at least one tag is low priority, the metadata associated with the virtual machine may be modified to include the name low priority. Any number of tags may be applied to the virtual machine in step 406 without departing from the invention. For example, at least one tag may, in fact, be multiple tags.

In step 408, a backup the virtual machine is generated based on backup/restoration policies and the at least one tag.

In one or more embodiments of the invention the backup of the virtual machine is generated when a backup policy of the backup/restoration policies keyed to the at least one tag is triggered. When the backup policy is triggered, a backup session for the virtual machine may be performed. Specifically, remote agent and orchestrate the backup generation policy by sending appropriate commands for production agent on a production host that host virtual machines. Under the guidance of the remote agent, the production agent and orchestrate generation and storage of a backup of the virtual machine. The backup may be stored in backup storage.

In one or more embodiments of the invention, multiple backup policies may be triggered the same time. In such a scenario, a composite workflow may be generated to generate backups in accordance with all of the triggered policies. Conflicts between the backup policies may be resolved using either default or customize rules. The default rules may be, for example, to use whichever parameters of the backup policies are more restrictive. Other default rules may be used without departing from the invention. Custom rules may be provided by clients, system administrators, or other users of the system. The composite workflow may be performed as part of Step 408 rather than all of the individual workflows specified by any number of concurrently triggered backup policies.

In one or more embodiments of the invention, when multiple backup policies are triggered a portion of one policy will override a portion of another policy. For example, based on the default or custom rules, parameters of a first backup policy that is less restrictive than parameters of a second backup policy will be overridden. In this manner, a composite workflow may be generated.

The method may end following step 408.

FIG. 4B shows a flowchart of a method in accordance with one or more embodiments of the invention. The method depicted in FIG. 4B may be used to perform a remote resource analysis of a virtual machine in accordance with one or more embodiments of the invention. The method shown in FIG. 4B may be performed by, for example, a remote agent (e.g., 110, FIG. 1). Other components of the system illustrated in FIG. 1 may perform the method of FIG. 4B without departing from the invention.

In step 410, an application executing on the virtual machine is identified.

In one or more embodiments of the invention, the application is identified via production agent executing the host that hosts the virtual machine. The application may be identified by the production agent by scanning executing resources of the virtual machine. For example, executing applications and be registered with an operating system of the virtual machine. The production agent and send request to the operating system for a list of exterior entities, or previously executing entities. The production agent may send a list of applications executing on the virtual machine to the remote agent.

In step 412, the application is categorized to identify a first dimension of the application profile.

In one or more embodiments of the invention, the application is categorized based on a computing resource consumption level of the application. For example, the type of the application may be used as a proxy for the computing resource consumption level the application. Applications that typically consume large amounts of computing resources such as, for example, databases may have a high categorization. In contrast, applications that typically consume small quantities of computing resources such as, for example, instant messaging services may have a low categorization. Other methods of categorizing applications may be used without parting from the invention.

The first dimension of the application profile may be based on the categorization. The application profile may include any number of dimensions. Each dimension may represent the type of the application. For example, a first dimension may be database application, i.e., a high resource consumption application type, and a second dimension may be messaging applications, i.e., a low resource consumption application type. As the quantity of that type of application increases, the rating associated with that dimension may be increased. For example, an application hosting two database applications and an instant messenger application may include two dimensions, one for databases and one for messaging applications. The database dimension may be twice as large as the messaging dimension in the application profile. Alternatively, the database dimension may be further scaled based on a multiplier associated with the application type. For example, database applications may be considered to be twice as resource consumption heavy as messaging applications. Other methods of weighting the dimension may be used without departing from the invention.

In one or more embodiments of the invention, the application profile is anonymized data. In other words, the dimensions may not be associated with actual applications. Rather, the dimensions may represent general categories of applications and corresponding magnitudes of each dimension may represent a cardinality or other quantification of the relative number of applications giving rise to each dimension.

In step 414, the application profiles updated based on the first dimension. In other words, the application profile may be updated based on the analysis of steps 410 and 412.

The method man following step 414.

The method of FIG. 4B may be repeated for any number of applications executing on the virtual machine. By doing so, application profile representative of all the applications executing on the virtual machine may be generated.

FIG. 4C shows a flowchart of a method in accordance with one or more embodiments of the invention. The method depicted in FIG. 4C may be used to perform a multidimensional analysis of a virtual machine in accordance with one or more embodiments of the invention. The method shown in FIG. 4C may be performed by, for example, a remote agent (e.g., 110, FIG. 1). Other components of the system illustrated in FIG. 1 may perform the method of FIG. 4C without departing from the invention.

In step 420, the first tag associated with the first dimension of the application profile is identified.

In one or more embodiments of the invention, the first tag is identified using tagging policies. For example, the tagging policies may specify tag for each type and magnitude of each dimension.

In step 422, a second tag associated with second dimension of the application profile is identified. The second tag may be identified similarly to the first tag. For example, the second dimension may be matched to a tagging policy that specifies the second tag.

While illustrated as two steps, steps 420 and 422 may be repeated as many times as necessary to identify tag for each dimension of the application profile. In this manner any number of tags may be identified.

In step 424, the first tag in the second tag are used as the at least one tag. In other words, any number of tags identified based on the dimensions of the application profile for virtual machine may be subsequently used for tagging purposes.

The method man following step 424.

As discussed above, tags applied to virtual machines may be dynamically changed. In some cases, tags may be added and/or removed.

FIG. 5 shows a flowchart of a method in accordance with one or more embodiments of the invention. The method depicted in FIG. 5 may be used to modify tags applied to entities based on changes in the status of the entity in accordance with one or more embodiments of the invention. The method shown in FIG. 5 may be performed by, for example, a remote agent (e.g., 110, FIG. 1). Other components of the system illustrated in FIG. 1 may perform the method of FIG. 5 without departing from the invention.

In step 500, a virtual machine status change is obtained.

In one or more embodiments of the invention, the virtual machine status change reflects a change to a status of a virtual machine. The status may be, for example, the change in execution state of the virtual machine.

In step 502, the tag impacted by the virtual machine status changed identified.

In one or more embodiments of the invention, the tag was not applied by the user. Rather, the tag may have been applied automatically by remote agent for backup service consistency purposes.

In step 504, the tag impacted by the virtual machine status change is removed. In other words, tags applied by the system may be automatically removed when the state virtual machine changes.

The method man following step 504.

To further clarify embodiments of the invention, a non-limiting example is provided in FIGS. 6A-6C.

Example

Consider a scenario as illustrated in FIG. 6A where a remote agent (600) provides backup services to a virtual machine (600). Virtual machine (600) may host a database application (612) and an accounting application (614). The provide backup services to the virtual machine, remote agent (600) may store backup data into backup storages: a first backup storage (620) and a second backup storage (630). The first backup storage (620) may be low-performance storage while the second backup storage (630) may be a high-performance storage.

At the point in time illustrated in FIG. 6A, the remote agent (600) may store first virtual machine backup (612) in the first backup storage (620). The first virtual machine backup (612) may reflect the application data of the virtual machine (610).

At a second point in time illustrated in FIG. 6B, the accounting application may terminate execution via the virtual machine (610). In response to the change in status of the virtual machine (610) resulting from the discontinued execution of the accounting application, the tagging applied to the virtual machine (610) may be automatically changed by the system. The tagging may be changed to increase a priority for generating backups of virtual machine (610).

At a third point in time illustrated in FIG. 6C, the remote agent (600) generated a second virtual machine backup (632) of the virtual machine (610). Because of the change in tagging associated with the virtual machine (610), a new backup policy is applied to generate the backup. In contrast to the prior backup policy, the current backup policy specified the backup was to be stored in the second backup storage (630). In accordance with current backup policy, the remote agent (600) automatically stores the second virtual machine backup (632) on the second backup storage (630).

In this manner, the system illustrated throughout FIGS. 6A-6C automatically prioritized and changed the backup workflow behavior virtual machines without user invention.

End of Example

Figure 7:
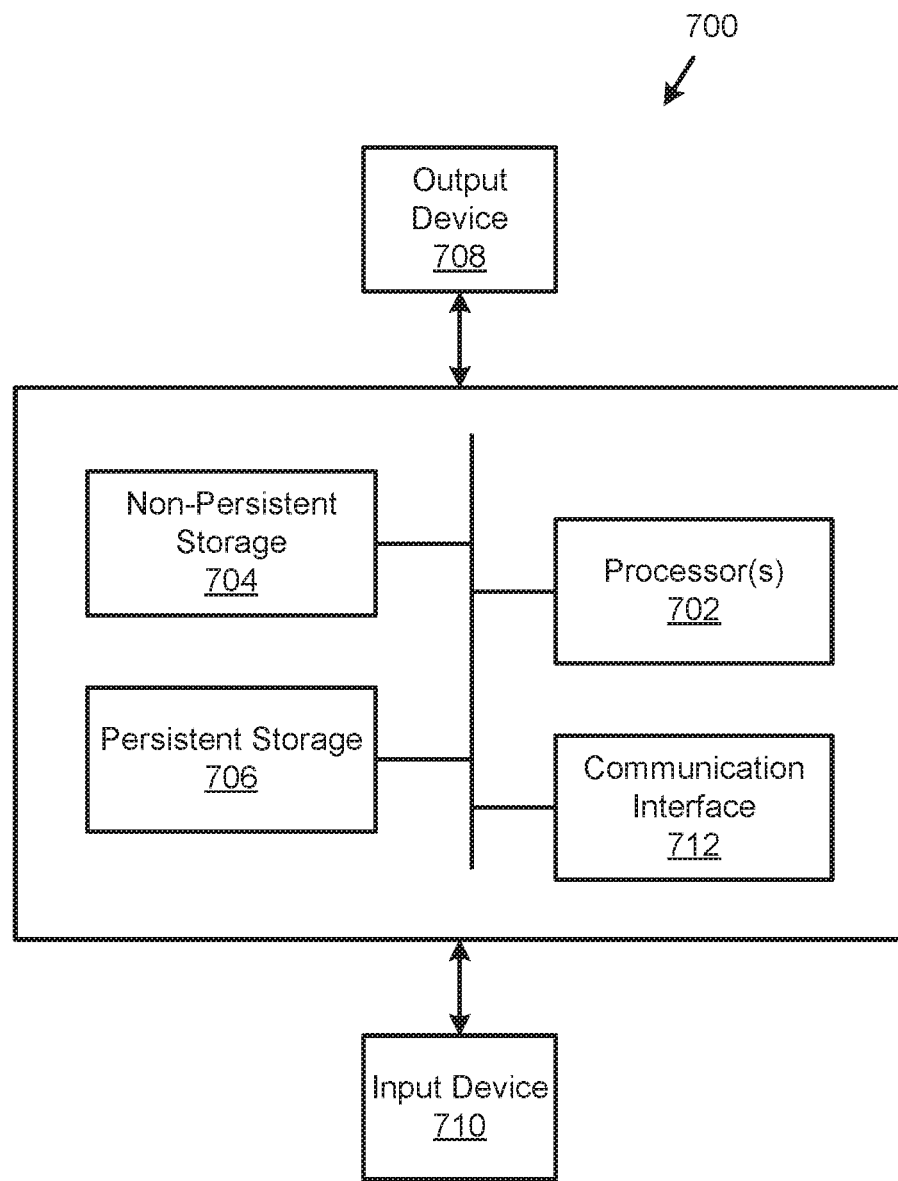
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One more embodiments of the invention improve backup generation technology by automatically changing backup workflows based on the relative importance of different resources throughout a distributed system. Embodiments of the invention may provide for automatic changing of backup workflows to reflect a relative importance of the resource for backup generation purposes. By doing so, embodiments of the invention improve the computing resource efficiency for performing backup generations. In contrast, contemporary static backup policies needlessly consume computing resources and become outdated nearly as soon as they are set. Embodiments of the mentioned may address this issue and other problems by indirectly determining the relative importance of different resources without being given knowledge of components of the resources. For example, resources such as virtual machines may be prioritized based on anonymized application metrics rather than names or characteristics of the applications. By doing so embodiments of the invention may provide efficient backup generation services without risking the release of information regarding resources of the distributed system.

Further, embodiments of the invention may decrease cognitive burden on users of the system. In contrast to contemporary systems that rely on users to set backup policy, embodiments of the mentioned may provide an automated method for managing backup generation services. All contemporary services rely on users setting backup policies, embodiments of the mention may not rely on user knowledge for backup services provisioning. As the number of virtualized entities increases, the burden on users is becoming too large for them to manage. Thus, embodiments of the invention may directly improve backup generation technology. Similarly, restoration technology is also improved by virtue of the improved backup technology.

Thus, embodiments of the invention may improve the field of distributed systems by improving the reliability of such systems. Ensuring that a minimum level backup services are provided to all entities within the system, even errors from users that would otherwise cripple the system such as, for example, forgetting to set appropriate backup policies, may be mitigated for distributed system in accordance with embodiments of the invention.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for managing virtual machines, comprising:
    a persistent storage that stores backup/restoration policies comprising:
        a first portion of policies that are selectively keyed to tags applied to the virtual machines, and
        a second portion of policies that are selectively keyed to the virtual machines;
    a backup manager that generates backups of the virtual machines based on the backup/restoration policies; and
    a resource tagger programmed to:
        obtain a management request for a virtual machine of the virtual machines;
        in response to obtaining the management request:
            perform a remote resource analysis of the virtual machine to obtain an application profile of the virtual machine;
            perform a multidimensional application analysis of the application profile to identify at least one tag that indicates a consumption rate of computing resources by an application specified by the application profile;
            apply the at least one tag to the virtual machine; and
            generate a backup of the virtual machine based on:
                one of the first portion of the policies, and
                one of the second portion of the policies.

2. The remote agent of claim 1, wherein the resource tagger is further programmed to:
    make a determination, in response to an application of a second tag to a second virtual machine of the virtual machines, that the second tag is not associated with any policy of the backup/restoration policies;
    in response to the determination:
        obtain a prototype policy associated with the virtual machine;
        modify the prototype policy based on the second tag to obtain a new backup policy; and
        add the new backup policy to the backup/restoration policies.

3. The remote agent of claim 1, wherein performing the remote resource analysis of the virtual machine comprises:
    identifying an application executing on the virtual machine;
    categorizing the application to identify a first dimension for the application profile; and
    updating the application profile based on the first dimension.

4. The remote agent of claim 3, wherein performing the multidimensional application analysis of the application profile to identify the at least one tag comprises:
    identifying a first tag associated with the first dimension;
    identifying a second tag associated with a second dimension of the application profile; and
    using the first tag and the second tag as the at least one tag, wherein the first tag is associated with a first backup policy of the backup/restoration policies, wherein the second tag is associated with a second backup policy of the backup/restoration policies.

5. The remote agent of claim 4, wherein applying the at least one tag to the virtual machine comprises:
    updating metadata associated with the virtual machine based on the at least one tag.

6. The remote agent of claim 1, wherein the application profile is anonymized and prevents the remote agent from learning identities of applications hosted by the virtual machine using the application profile.

7. The remote agent of claim 6, wherein the application profile specifies categories of the applications hosted by the virtual machine.

8. The remote agent of claim 7, wherein the application profile further specifies a count of each of the categories of the applications hosted by the virtual machine.

9. The remote agent of claim 8, wherein the application profile further specifies an accounting of a quantity of computing resources utilized by each of the applications hosted by the virtual machine over a predetermined period of time.

10. The remote agent of claim 1, wherein the application profile specifies an accounting of a quantity of computing resources utilized by each of the applications hosted by the virtual machine over a predetermined period of time.

11. The remote agent of claim 1, wherein the backup/restoration policies further comprise at least one policy that is keyed to all of the virtual machines that are untagged.

12. A method for managing virtual machines using backup/restoration policies comprising: a first portion of policies that are selectively keyed to tags applied to the virtual machines and a second portion of policies that are selectively keyed to the virtual machines, comprising:
    obtaining a management request for a virtual machine of the virtual machines;
    in response to obtaining the management request:
        performing a remote resource analysis of the virtual machine to obtain an application profile of the virtual machine;
        performing a multidimensional application analysis of the application profile to identify at least one tag that indicates a consumption rate of computing resources by an application specified by the application profile;
        applying the at least one tag to the virtual machine; and
        generating a backup of the virtual machine based on:
            one of the first portion of the policies, and
            one of the second portion of the policies.

13. The method of claim 12, wherein the method further comprises:
    making a determination, in response to an application of a second tag to a second virtual machine of the virtual machines, that the second tag is not associated with any policy of the backup/restoration policies;
    in response to the determination:
        obtaining a prototype policy associated with the virtual machine;
        modifying the prototype policy based on the second tag to obtain a new backup policy; and
        adding the new backup policy to the backup/restoration policies.

14. The method of claim 12, wherein performing the remote resource analysis of the virtual machine comprises:
    identifying an application executing on the virtual machine;
    categorizing the application to identify a first dimension for the application profile; and
    updating the application profile based on the first dimension.

15. The method of claim 14, wherein performing the multidimensional application analysis of the application profile to identify the at least one tag comprises:
    identifying a first tag associated with the first dimension;
    identifying a second tag associated with a second dimension of the application profile; and
    using the first tag and the second tag as the at least one tag, wherein the first tag is associated with a first backup policy of the backup/restoration policies, wherein the second tag is associated with a second backup policy of the backup/restoration policies.

16. The method of claim 15, wherein applying the at least one tag to the virtual machine comprises:
updating metadata associated with the virtual machine based on the at least one tag.

17. A non-transitory computer readable medium comprising computer readable program code, which when executed by a computer processor enables the computer processor to perform a method for managing virtual machines using backup/restoration policies comprising: a first portion of policies that are selectively keyed to tags applied to the virtual machines and a second portion of policies that are selectively keyed to the virtual machines, the method comprising:
obtaining a management request for a virtual machine of the virtual machines;
in response to obtaining the management request:
performing a remote resource analysis of the virtual machine to obtain an application profile of the virtual machine;
performing a multidimensional application analysis of the application profile to identify at least one tag that indicates a consumption rate of computing resources by an application specified by the application profile;
applying the at least one tag to the virtual machine; and
generating a backup of the virtual machine based on:
one of the first portion of the policies, and
one of the second portion of the policies.

18. The non-transitory computer readable medium of claim 17, wherein the method further comprises:
making a determination, in response to an application of a second tag to a second virtual machine of the virtual machines, that the second tag is not associated with any policy of the backup/restoration policies;
in response to the determination:
obtaining a prototype policy associated with the virtual machine;
modifying the prototype policy based on the second tag to obtain a new backup policy; and
adding the new backup policy to the backup/restoration policies.

19. The non-transitory computer readable medium of claim 17, wherein performing the remote resource analysis of the virtual machine comprises:
identifying an application executing on the virtual machine;
categorizing the application to identify a first dimension for the application profile; and
updating the application profile based on the first dimension.

20. The non-transitory computer readable medium of claim 19, wherein performing the multidimensional application analysis of the application profile to identify the at least one tag comprises:
identifying a first tag associated with the first dimension;
identifying a second tag associated with a second dimension of the application profile; and
using the first tag and the second tag as the at least one tag.

* * * * *